United States Patent [19]
Breitscheidel et al.

[11] Patent Number: 6,121,188
[45] Date of Patent: Sep. 19, 2000

[54] FIXED-BED RANEY METAL CATALYST, ITS PREPARATION AND THE HYDROGENATION OF POLYMERS USING THIS CATALYST

[75] Inventors: Boris Breitscheidel, Limburgerhof; Uwe Diehlmann, Neustadt; Thomas Rühl, Frankenthal; Sabine Weiguny, Freinsheim, all of Germany

[73] Assignee: BASF Aktiengesellschaft, Ludwigshafen, Germany

[21] Appl. No.: 08/951,125

[22] Filed: Oct. 15, 1997

[30] Foreign Application Priority Data

Oct. 18, 1996 [DE] Germany ................ 196 43 126

[51] Int. Cl.⁷ .................. B01J 25/00; B01J 25/02
[52] U.S. Cl. .................. 502/301; 502/300; 502/325; 502/326; 502/327; 502/332; 502/333; 502/334; 502/335; 502/336; 502/337; 502/338; 502/339; 502/344; 502/345; 502/346; 502/355
[58] Field of Search ................ 502/300, 301, 502/325, 326, 327, 332, 333, 334, 335, 336, 337, 338, 339, 344, 345, 346, 355

[56] References Cited

U.S. PATENT DOCUMENTS

| | | |
|---|---|---|
| 2,456,428 | 12/1948 | Parker . |
| 2,585,583 | 2/1952 | Pinkney . |
| 2,647,146 | 7/1953 | Arthur, Jr. . |
| 3,122,526 | 2/1964 | Schuller et al. . |
| 4,371,612 | 2/1983 | Matsumoto et al. ............ 435/44 |
| 4,826,799 | 5/1989 | Cheng et al. ............ 502/301 |
| 4,895,994 | 1/1990 | Cheng et al. ............ 585/270 |
| 5,536,694 | 7/1996 | Schuetz et al. ............ 502/301 |
| 5,733,838 | 3/1998 | Vicari et al. ............ 502/335 |

FOREIGN PATENT DOCUMENTS

| | | |
|---|---|---|
| 648534 | 4/1995 | European Pat. Off. . |
| 1226303 | 1/1963 | Germany . |
| 2905671 | 8/1979 | Germany . |
| 4335360 | 4/1995 | Germany . |
| 4345265 | 9/1995 | Germany . |
| 4446907 | 7/1996 | Germany . |

OTHER PUBLICATIONS

Curry–Hyde et al., *Applied Catalysis, A. General*, vol. 95, 1993, pp. 65–74. No Month Available.

*Primary Examiner*—Elizabeth D. Wood
*Attorney, Agent, or Firm*—Keil & Weinkauf

[57] ABSTRACT

An activated fixed-bed Raney metal catalyst which is free of metal powder, has macropores and is based on an alloy of aluminum and at least one metal of subgroup VIII of the Periodic Table, contains more than 80% by volume, based on the total pores, of macropores and is used for the hydrogenation of low molecular weight and polymeric organic compounds.

22 Claims, No Drawings

FIXED-BED RANEY METAL CATALYST, ITS PREPARATION AND THE HYDROGENATION OF POLYMERS USING THIS CATALYST

The present invention relates to a novel fixed-bed Raney metal catalyst which is free of metal powder, has macropores and is based on an alloy of aluminum and at least one metal of subgroup VIII of the Periodic Table, a precursor for this catalyst, a process for its preparation, the use of the novel catalyst for the hydrogenation of organic compounds, in particular of polymers having hydrogenatable groups, preferably having nitrile groups.

Raney catalysts, in particular fixed-bed Raney metal catalyst, have long been known and appropriate processes for their preparation as well as their applications have been widely described.

U.S. Pat. Nos. 4,826,799 and 4,895,994 describe the preparation of activated fixed-bed Raney metal catalysts by mixing a powder of an alloy of catalyst metal and aluminum with an organic polymer and, if required, a molding assistant, molding this mixture to give desired moldings and calcining the moldings in a two-stage process in air at above 850° C. This is followed by the activation of the moldings by leeching the residual aluminum not oxidized during the calcination.

This process leads to a catalyst which has a pore system. The pore system in the finished catalyst permits the diffusion of molecules of starting materials into the catalyst and of product molecules out of the catalyst. The macroporosity of the catalysts described there is from 50 to 80%, based on the total pore volume.

However, the catalysts prepared according to U.S. Pat. Nos. 4,826,799 and 4,895,994 have serious disadvantages. For example, they contain from 1 to 42% by weight, based on the total catalyst, of α-alumina.

The α-alumina used as a binder is catalytically inactive and therefore reduces the catalyst activity. During calcination, a more or less closed layer of this inactive, alkali-insoluble material forms on the surface of the alloy particles. This makes it more difficult to activate the alloy. In the finished catalyst, this layer constitutes a diffusion barrier for the starting material molecules, which leads to additional losses of activity.

Modern catalyst systems must be easily recyclable in order to protect the environment. However, working up ceramically bound fixed-bed metal catalysts is difficult owing to the insoluble ceramic binder.

DE 4 335 360, DE 4 345 265 and EP 648 534 describe activated fixed-bed Raney metal catalysts which are obtained by molding a powder of at least one catalyst alloy with a powder of the pure catalyst metals with the addition of molding assistants and pore formers and carrying out subsequent calcination at below 850° C. During the calcination, the molding assistants and pore formers undergo combustion while alloy powder and metal powder sinter together to give a porous molding. By leeching the aluminum contained in the catalyst alloys with sodium hydroxide solution, the molding is activated in a superficial shell.

A decisive disadvantage of these activated fixed-bed metal catalysts is that these catalysts are only partially macroporous and are therefore of only limited suitability for the catalytic reaction of relatively large molecules. Moreover, in order to achieve sufficiently high mechanical stability of the catalyst molding, pure catalyst metals must be added to said molding during the preparation, having an adverse effect on the production costs and hence on the cost-efficiency of the catalysts. In addition, these fixed-bed metal catalysts can be only superficially activated in order to ensure sufficient mechanical stability of the moldings even in the activated state. However, superficial activation has an adverse effect on catalytic activity.

DE-4 446 907 describes a process for the preparation of a Raney hydrogenation catalyst based on an alloy of aluminum and transition metal, with the use of a mixture of polyvinyl alcohol and water or stearic acid as an assistant. The molar mass of the polyvinyl alcohol is from 3000 to 6000 g/mol.

The disadvantage of the process described there is the use of low molecular weight polyvinyl alcohols as assistants. This leads to a small proportion of macropores and hence to lower catalyst activity.

As stated at the outset, the present invention also relates to the use of the novel catalyst for the hydrogenation of organic compounds, in particular for the hydrogenation, dehydrogenation, hydrogenolysis, aminating hydrogenation and dehalogenation of organic compounds, and a process for the hydrogenation of a polymer which has at least one hydrogenatable group in the presence of the novel catalyst.

A group of polymers which were used particularly intensively in the past as starting materials in processes for the hydrogenation of polymers comprises polymers having nitrile groups. These are also preferably used in the novel process, the corresponding amino-containing polymers being obtained.

The amino-containing polymers obtained in this process can be used, for example, as branching agents, crosslinking agents or complexing agents, such polymers preferably being employed, for example, in papermaking, in the detergent industry, in adhesives and cosmetics.

Many systems were described in the past for the reduction of polymers which contain nitrile groups into polymers which contain amino groups, the reduction with complex metal hydrides, as described, for example, in German Patents DE 1 226 303 and DE 2 905 671, being mentioned as well as the hydrogenation with hydrogen.

The latter is substantially more economical and, in contrast to the reduction with complex metal hydrides, requires only catalytic amounts of a metal-containing component, which has both economic and ecological advantages.

The hydrogenation with hydrogen was carried out in the past under both homogeneous and heterogeneous catalysis.

Homogeneous catalysis is chemically elegant, but the removal of the catalyst is substantially more expensive than in the case of heterogeneous catalysis. Particularly in catalytic processes involving polymers, the use of a homogeneous catalyst is disadvantageous since the polymeric product cannot be separated from the catalyst by distillation. If it is desired to separate the polymeric product from the homogeneous catalyst by crystallization or precipitation, this requires repeated crystallization since occlusions of the catalyst are unavoidable, leading to longer reaction times and higher costs.

Problems with the removal of the catalyst do not occur in the reaction under heterogeneous catalysis. However, the heterogeneous catalysis processes known to the date for the hydrogenation of polymers which contain nitrile groups with the use of fixed-bed Raney metal catalysts frequently only leads to unsatisfactory conversions and selectivities.

For example, U.S. Pat. No. 2,456,428 describes the hydrogenation of polyacrylonitrile, polymethacrylonitrile and similar polymers. After the hydrogenation in the presence of Raney nickel as a catalyst, unconverted polymer must be separated off before the further working up. The reaction described there accordingly has not gone to completion, and the yields to be achieved with this process are poor.

According to U.S. Pat. No. 3,122,526, which relates to the hydrogenation of cyanoethylated polyacrylonitrile with the use of Raney nickel as a catalyst, only a moderate yield of the corresponding amine of less than 10% is likewise obtained.

U.S. Pat. No. 2,585,583 describes the hydrogenation of copolymers of butadiene and acrylonitrile or methacrylonitrile over suspended hydrogenation catalysts. U.S. Pat. No. 2,674,146 describes the hydrogenation of butadiene oligomers having terminal nitrile groups with the use of a mixture of two suspended catalysts (Pd on carbon and Ni on kieselguhr). According to these two processes, the catalysts used there must be separated from the reaction solution in each case by filtration.

In summary, it may therefore be stated that the hydrogenation of polymers which contain nitrile groups to give polymer which contain amino groups is known but good yields of the amino-containing polymer have only been achieved to date using suspended catalysts. These have to be separated from the reaction solution by filtration and cannot be used in a fixed-bed reactor.

In view of the abovementioned prior art, it is an object of the present invention to provide a fixed-bed Raney metal catalyst which has macropores, sufficient mechanical stability and high catalytic activity and avoids the described disadvantages of the prior art, such as an insufficient proportion of macropores or the presence of significant amounts of $\alpha$-alumina.

It is a further object of the present invention to provide a process for the hydrogenation of a polymer which has at least one hydrogenatable group, with the aid of which the corresponding hydrogenated polymer can be prepared with high conversion and high yields.

We have found that these objects are achieved by the novel catalyst and the novel process for the hydrogenation of a polymer which has at least one hydrogenatable group.

More precisely, the present invention relates to an activated fixed-bed Raney metal catalyst which is free of metal powder, has macropores and is based on an alloy of aluminum and at least one metal of subgroup VIII of the Periodic Table, wherein the catalyst contains more than 80% by volume, based on the total pores, of macropores.

THE CATALYST AND ITS PREPARATION

According to the definition in Pure Applied Chem., 45 (1976), 71 et seq., in particular, the term macropores used in the present application denotes pores whose diameter exceeds 50 nm. The content of macropores, based on the total pores, ie. the macroporosity of the novel catalyst, is more than 80, preferably at least 90, in particular more than 95, % by volume, based in each case on the total pores.

It should be noted in this context that, according to the invention, a catalyst precursor which is free of metal powder and is based on an alloy of aluminum and at least one metal of subgroup VIII of the Periodic Table is first prepared, for example according to stages (1) to (3) of the novel process described further below, which precursor likewise has a content of macropores of more than 80% by volume, based on the total pores.

The content of $\alpha$-$Al_2O_3$ is generally kept relatively low since, as stated above, $\alpha$-$Al_2O_3$ prevents activation of the catalyst and is preferably present in an amount of less than 1, more preferably less than 0.5, in particular less than 0.3, % by weight, based in each case on the total weight of the catalyst. The lower limit of the $\alpha$-$Al_2O_3$ content is in general about 0.01% by weight.

Although in principle all metals of subgroup VIII of the Periodic Table or mixtures of two or more of these metals can be used as alloy components in addition to aluminum for the preparation of the novel fixed-bed metal catalyst, nickel, cobalt, iron or copper or a mixture of two or more thereof is preferably used as a metal of subgroup VIII of the Periodic Table.

The weight ratio of aluminum to transition metal is as a rule from about 30 to about 70% by weight of aluminum and from about 30 to about 70% by weight of the metal of subgroup VIII of the Periodic Table.

According to a further embodiment, the novel catalysts are also promoted with at least one element of subgroup IV, V, VI or VIII of the Periodic Table or with a mixture of two or more thereof in order to increase the activity and selectivity. Particularly suitable promoters are chromium, iron, cobalt, tantalum, titanium, molybdenum and metals of subgroup VIII of the Periodic Table. It should be noted that, if an element of subgroup VIII of the Periodic Table or a mixture of two or more such elements is used as promoter, this element or these elements differs or differ from the abovementioned one or more metals of subgroup VIII as an alloy component.

It is possible either to add the promoters to the starting mixture for the preparation of the alloy or to apply them subsequently to the activated catalyst. If a promoter is used, its content is from about 0.01 to about 15, preferably from about 0.1 to 5, % by weight, based on the total weight of the catalyst.

The aluminum alloy of the novel catalyst is prepared in a known manner, for example by the process described in DE 2 159 736, the content of which with regard to the preparation of alloys of aluminum and at least one metal of subgroup VIII of the Periodic Table, of the type under discussion here, is hereby incorporated by reference.

Accordingly, the present invention also relates to a process for the preparation of an activated fixed bed Raney metal catalyst which is free of metal powder, has macropores and is based on an alloy of aluminum and at least one metal of subgroup VIII of the Periodictable, wherein the catalyst contains more than 80% by volume, based on the total pores of macropores, which comprises the following stages:

(1) preparation of kneaded material containing the alloy, a molding assistant, water and a pore former, (2) shaping of the kneaded material to give a molding, (3) calcination of the molding and (4) treatment of the calcined molding with an alkali metal hydroxide, wherein at least one water-miscible polymer having a molar mass of from more than 6000 to 500,000 g/mol is used as the pore former.

The molding assistant used may be any molding assistant used in the prior art, as mentioned, for example, in U.S. Pat. Nos. 4,826,799, 4,895,994, 3,404,551 and 3,358,495. Waxes, such as Wachs C Mikropulver PM from HOECHST AG, fats, such as magnesium stearate or aluminum stearate, or carbohydrate-containing polymers, such as tylose (methylcellulose), are preferably used, stearic acid and tylose being more preferably used. The kneaded material contains in general from about 0.1 to 3, preferably from about 0.2 to about 2, especially from about 0.5 to about 1, % by weight of the molding assistant.

The pore formers used may be any water-miscible polymers, provided that they have a molar mass of from more than 6000 to about 500,000 g/mol. Their molar mass is preferably from about 13,000 to about 150,000, in particular from about 13,000 to about 50,000 g/mol.

Examples of polymers which may be used as pore formers in the novel process include polyvinyl chloride, copolymer of an olefin with polar comonomers, eg. ethylene or propylene with polyvinyl chloride, polyvinylidene chloride copolymers, ABS resins, polyethylene copolymers with vinyl acetate, alkyl acrylates, acrylic acid, etc., chlorinated polyethylenes, chlorosulfonated polyethylenes, thermoplastic polyurethanes, polyamides, such as nylon 5, nylon 12, nylon 6/6, nylon 6/10 and nylon 11, fluorine-containing resins, eg. FEP, polyvinylidene fluoride and polychlorotrifluoroethylene, acrylonitrile/methyl (meth) acrylate copolymers, acrylonitrile/vinyl chloride copolymers, styrene/acrylonitrile copolymers, such as methacrylonitrile/styrene copolymers, polyalkyl (meth) acrylates, cellulose acetate, cellulose acetobutyrate, polycarbonates, polysulfones, polyphenylene oxide, polyesters, eg. butylene terephthalate, and polyvinyl alcohol, polyvinyl alcohol being particularly preferred.

The content of pore former in the kneaded material is from about 1 to about 20, preferably from about 4 to about 8, % by weight, based in each case on the total weight of the kneaded material.

When choosing the polymer to be used as a pore former, it is important that it is a water-miscible polymer so that, in the course of the novel process, it can be removed as completely as possible from the molding and the macropore content of more than 80% by volume, desirable according to the invention, can thus be achieved.

The preparation of the novel catalyst is to be described in detail below.

According to the invention, a kneaded material is generally first prepared from the alloy, the molding assistant and the pore former. Said material can be molded to give a molding, pellets and extrudates being preferred. The processing to give the moldings is carried out in apparatuses known for this purpose, for example in extruders or tablet presses.

In a preferred embodiment, the alloy is first mixed with the molding assistant and the usually solid polymer as a pore former, and water is then added in portions until a readily moldable, plastic material is obtained. The mixing or kneading apparatuses usually used are employed for the preparation of such kneaded materials.

In a particular embodiment, extrudates having a diameter of 3.0 mm are produced and, after emerging from the extruder, are as a rule immediately exposed to a temperature of from 100 to 200° C. for a period of from 0.2 to 2 minutes for initial drying. Drying is then carried out at 120° C. for from 12 to 24 hours.

The calcination of the moldings is preferably carried out as a particularly gentle three-stage calcination process at atmospheric pressure. The moldings are preferably treated first for from 1 to 3 hours at from about 400 to about 500° C., then for from 1 to 3 hours at from about 700 to about 800° C. and then for from 1 to 3 hours at from about 900 to about 1000° C. The calcination is usually carried out at atmospheric pressure in air.

According to the invention, the calcined moldings are activated with an alkali metal hydroxide, preferably lithium hydroxide, sodium hydroxide, potassium hydroxide or caesium hydroxide, individually or as a mixture, particularly preferably sodium hydroxide individually or as a mixture with the abovementioned alkali metal hydroxides. As a rule, an aqueous solution of the alkali metal hydroxides, preferably sodium hydroxide solution, is used, a weight ratio of water to alkali metal hydroxide of in general from about 10:1 to about 30:1, preferably from about 15:1 to about 25:1, being used. The molar ratio of alkali metal hydroxide to aluminum is as a rule from about 1:1 to about 4:1, preferably from about 1.5:1 to about 2.5:1.

The temperature of the activation is usually from about 25° C. to about 95° C., preferably from about 45° C. to about 90° C.

The duration of the activation depends essentially on the desired final content of aluminum and is from 10 to 30, preferably from 15 to 25, hours. The activation procedure may also be carried out repeatedly.

After the activation, the moldings are washed with water, preferably until the wash water has a pH of at least 8. The washed, activated moldings are stored under water, preferably in a mixture of water and methanol.

The catalysts thus prepared have high mechanical stability.

The present invention furthermore relates to an activated fixed-bed Raney metal catalyst which is free of metal powder, has macropores and is based on an alloy of aluminum and at least one metal of subgroup VIII of the Periodic Table, obtainable by a process which comprises the following stages:

(1) preparation of a kneaded material containing the alloy, a molding assistant, water and a pore former, (2) shaping of the kneaded material to give a molding, (3) calcination of the molding and (4) treatment of the calcined molding with an alkali metal hydroxide, wherein at least one water-miscible polymer having a molar mass of from more than 6000 to about 500,000 g/mol is used as the pore former, and a precursor for an activated fixed-bed Raney metal catalyst which is free of metal powder, has macropores and is based on an alloy of aluminum and at least one metal of subgroup VIII of the Periodic Table, obtainable by a process which comprises the following stages:

(1) preparation of a kneaded material containing the alloy, a molding assistant, water and a pore former, (2) shaping of the kneaded material to give a molding and (3) calcination of the molding, wherein at least one water-miscible polymer having a molar mass of from more than 6000 to about 500,000 g/mol is used as the pore former.

The novel catalysts may be used for hydrogenations, dehydrogenations, hydrogenolyses, aminating hydrogenations and dehalogenations of organic molecules, preferably of the hydrogenation of C—C and C—N double and triple bonds, of carbonyl-containing compounds, for ether cleavage, for the reduction of nitro compounds and oximes and for the preparation of secondary amines from ketones and primary amines.

The term "organic compound" as used within the present invention comprises all organic compounds including low molecular weight (monomeric) and polymeric organic compounds which may be catalytically reacted, in particular those which exhibit groups which are treatable with hydrogen, such as C—C-double or C—C-triple bonds. This term comprises low molecular weight organic compounds as well as polymers. "Low molecular weight organic compounds" are compounds having a molecular weight of below 500. The term "polymer" is definded as relating to molecules having a molecular weight of higher than about 500.

The present invention relates particularly to a process for reacting an organic compound in the presence of a catalyst as defined herein, wherein the reaction is a hydrogenation, dehydrogenation, hydrogenolysis, aminating hydrogenation or dehalogenation, more preferably a hydrogenation.

In particular, organic compounds having one or more of the following structural units may be used:

$C=C$ (I)

$C\equiv C$ (II)

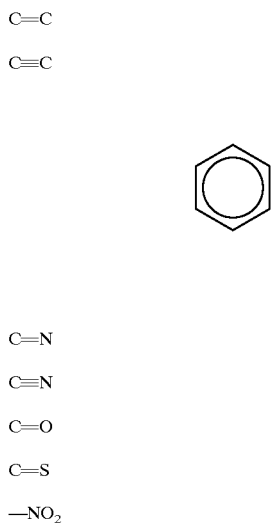 (III)

$C=N$ (IV)

$C\equiv N$ (V)

$C=O$ (VI)

$C=S$ (VII)

$-NO_2$ (VIII)

The following may be mentioned by way of example: the hydrogenation of aromatic compounds, eg. benzene, toluenes, xylenes, napthalenes and substituted derivatives thereof, to give the corresponding alicyclic compounds; the hydrogenation of alkenes or alkynes, eg. ethylene, propylene, 1- and 2-butene and 1-, 2-, 3- and 4-octene, to give the corresponding alkanes; the hydrogenation of nitroalkanes, eg. nitroethane, nitromethane, nitropropane and 1,1-dinitroethane, to give the corresponding amines; the hydrogenation of nitroaromatics, eg. nitrotoluenes, nitrobenzene, dinitrobenzenes, dinitrotoluenes, nitroxylenes, dinitroxylenes, nitronaphthalenes and chloro- and dichloronitrobenzenes; the hydrogenation of nitriles, preferably aliphatic or aromatic mono or dinitriles, such as acetonitrile, propionitrile, butyronitrile, stearic acid nitrile, isocrotonic acid nitrile, 3-butinnitrile, 2,3-butadiene nitrile, 2,4-pentadiene nitrile, 3-hexene-1,6-dinitrile, chloracetonitrile, trichloracetonitrile, lactic acid nitrile, phenol acetonitrile, 2-chlorbenzonitrile, 2,6-dichlorbenzonitrile, isophthalonitrile, particularly aliphatic alpha, omega-dinitriles, such as succinonitrile, glutaronitrile, adiponitrile, pimelicnitrile and suberic nitrile or aminonitriles, such as 4-amino butanoic acid nitrile, 5-aminopentanoic acid nitrile, 6-aminohexanoic acid nitrile, 7-aminoheptanoic acid nitrile and 8-aminooctanoic acid nitrile, to give the corresponding mono- or diamino compounds; the hydrogenation of imines, eg. quinoneimines, ketimines, keteneimines or aliphatic imines, eg. propylimine or hexylimine; the dehalogenation of halogen-containing organic compounds, in particular of aromatic halogen-containing compounds, eg. chloro- and bromobenzene; bromo- and chlorotoluenes and chloro- and bromoxylenes, where it is also possible in each case to use compounds substituted by a plurality of halogen atoms; the aminating hydrogenation of, for example, alcohols, such as vinyl alcohol; and hydrogenolyses, for example the conversion of esters into the corresponding acids and alcohols.

Within the process of the invention it is also possible to react, in particular in hydrogenate, compounds comprising $C=O$ groups, i.e. in particular aldehydes, ketones, carboxylic acids and their derivatives, such as carboxylic acid esters, carboxylic acid halides and carboxylic anhydrides, and mixtures of two or more of the above-mentioned compounds.

In particular aldehydes and ketones, preferably those having 1 to 20 C atoms, such as formaldehyde, acetaldehyde, propionaldehyde, n-butyraldehyde, valeraldehyde, caproaldehyde, heptaldehyde, phenylacetaldehyde, acrolein, crotonaldehyde, benzaldehyde, o-, m-, p-tolualdehyde, salicylic, aldehyde, anisaldehyde, vanillin, zinnamic aldehyde, acetone, methyl ethyl ketone, 2-pentanone, 3-pentanone, 2-hexanone, 3-hexanone, cyclohexanone, isophorone, methyl isopropyl ketone, methyl isopropentyl ketone, methyl sec-butyl ketone, methyl isobutyl ketone, mesityl oxide, acetophenone, propionhenone, benzophenone, benzalacetone, dibenzalacetone, benzalacetophenone, glycol aldehyde, glyoxal, 2,3-butandione, 2,4-pentandione, 2,5-hexandione, terephthalaldehyde, glutaraldehyde, diethylketone, methyl vinyl ketone, acetylacetone, 2-ethylhexanal, or mixtures of two ore more thereof, may be used.

Furthermore, also polyketones, such as copolymers of ethylene and CO are used.

Furthermore, carboxylic acids and derivatives thereof, preferably those having 1 to 20 C-atoms may be reacted. In particular, the following are to be mentioned:

Carboxylic acids, such as formic acid, acetic acid, propanoic acid, butanoic acid, iso-butanoic acid, n-valeric acid, pivalic acid, caproic acid, heptanoic acid, octanoic acid, decanoic acid, lauric acid, myristic acid, palmitic acid, stearic acid, acrylic acid, methacrylic acid, oleic acid, elaidic acid, linoleic acid, linolenic acid, cyclohexane carboxylic acid, benzoic acid, phenylacetic acid, o-, m-, p-toluylic acid, o-, p-chlorotenzoic acid, o-, p-nitrobenzoic acid, salicylic acid, p-hydroxybenzoic acid, anthranilic acid, p-aminobenzoic acid, oxalic acid, malonic acid, succinic acid, glutaric acid, adipic acid, pimelic acid, suberic acid, azelaic acid, sebaic acid, maleic acid, fumaric acid, phthalic acid, isophthalic acid, teraphthalic acid, and mixtures of two or more thereof.

Carboxylic acid halides, such as the chlorides and bromides of the above-mentioned carboxylic acids, in particular acetylchloride or-bromide, stearic acid chloride or -bromide and benzoic acid chloride or -bromide, which are dehalogenated.

Carboxylic acid esters, such as the $C_1$- to $C_{10}$-alkyl esters of the above-mentioned carboxylic acids, particularly methyl formiate, acetic acid ester, butanoic acid butyl ester, dimethyl terephthalate, dimethyl adipate, methyl (meth) acrylate, butyrolactone, caprolacone and polycarboxylic acid esters, such as polyacrylic and polymethylacrylic acid esters and copolymers and polyesters thereof, such as poly (meth)acrylates); these esters are in particular hydrogenated, i.e. the esters are reacted to the corresponding acids and alcohols.

Carboxylic anhydrides, such as anhydrides of the above-mentioned carboxylic acids, in particular acetic acid anhydride, propanoic acid anhydride, benzoic acid anhydride and maleic anhydride.

Carboxylic acid amides, such as amides of the above-mentioned carboxylic acids, such as formamide, acetamide, propionic amide, stearamide and terephthalamide.

In addition thereto, also hydroxy carboxylic acids, such as lactic, malic acid, tartaric acid or citric acid, or amino acids, such as glycine, alanine, proline and arginine may be reacted.

The novel catalysts can be used in particular for hydrogenations, dehydrogenations, hydrogenolyses, aminating hydrogenations and dehalogenations of large molecules, preferably of polymeric compounds.

Accordingly, the present invention also relates to a process for the hydrogenation of a polymer which has at least one hydrogenatable group in the presence of the novel catalyst, the hydrogenation of polymers having nitrile groups, for example styrene/butadiene copolymers and acrylonitrile copolymers, and the aminating hydrogenation of polyvinyl alcohols and polyketones being preferred.

The present invention relates in particular to a process for the hydrogenation of a polymer which has at least one nitrile group in the presence of the abovementioned catalyst.

The term polymer which has at least one hydrogenatable unit applies to all polymers which have units which undergo hydrogenation, in particular to polymers which have units of the following structures (I) to (VIII) or a halogen atom. It is self-evident that the polymers under discussion here contain the respective unit at least once and that one or more units of two or more of the following structures may also be present within the polymer reacted according to the invention:

C=C (I)

C≡C (II)

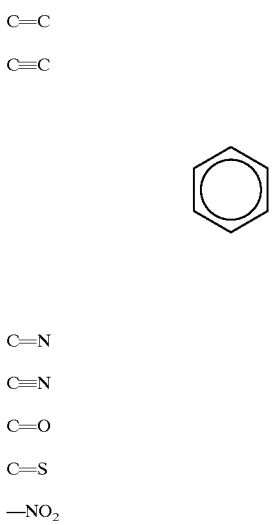

(III)

C=N (IV)

C≡N (V)

C=O (VI)

C=S (VII)

—NO₂ (VIII)

The weight average molecular weight of the polymers to be hydrogenated in the novel process is in general from about 500 to about 500,000, preferably from about 1000 to about 100,000, more preferably from about 1000 to about 50,000.

Examples of polymers which can be hydrogenated in the novel process are the following:

polymers having C—C double bonds, such as polybutadiene, eg. poly(2,3-dimethylbutadiene), polyisoprene, polyacetylenes, polycyclopentadienes and polycyclohexadienes; polymers having C—C triple bonds, such as polydiacetylenes; polymers having aromatic groups, such as polystyrene, acrylonitrile/butadiene/styrene terpolymers and strene/acrylonitrile copolymers; polymers having C—N triple bonds, eg. polyacrylonitrile, polyacrylonitrile copolymers with, for example, vinyl chloride, vinylidene chloride, vinyl acetate or (meth)acrylates or mixtures of two or more thereof as comonomers; polymers having C—O double bonds, such as polyesters, polyacrylamides, polyacrylic acids, polyureas and polyketones; polymers having C—S double bonds, eg. polysulfones and polyether-sulfones; halogen-containing polymers, such as polyvinyl chloride and polyvinylidene chloride and nitro-containing polymers which may be obtained by nitration of, for example, polyolefins by polymer-analogous reaction.

Examples of polymers preferably used in the present invention include polyisoprene, polybutadiene, styrene/butadiene copolymers, acrylonitrile/butadiene copolymers, acrylonitrile/styrene/butadiene copolymers, styrene/isoprene/styrene three-block copolymers, styrene/butadiene/styrene three-block copolymers and styrene/butadiene/styrene star block copolymers.

In general, complete hydrogenation of the starting materials used takes place. However, the hydrogenation can also be carried out in such a way that, by a suitable choice of temperature, H₂ pressure and amount of H₂, only one type of hydrogenatable groups is hydrogenated whereas the other type of hydrogenatable groups is not hydrogenated.

The novel process is particularly suitable for the hydrogenation of polymers which contain units of different structures, as defined above, for example polymers which have both C—C multiple bonds and nitrile groups, since the catalysts used in the novel process are capable of first selectively hydrogenating the nitrile groups, ie. of achieving from about 90 to 100% hydrogenation of these groups, whereas simultaneously less than 25%, in general from 0 to 7%, of the ethylenically unsaturated regions are first hydrogenated.

After the end of the hydrogenation of the nitrile groups present in the polymers, it is of course possible, by supplying further hydrogen, also virtually quantitatively to hydrogenate the remaining unsaturated groups present in the polymer, for example ethylenic units.

The novel process can be used both for already isolated and for living polymers.

In the novel process or the novel use, the hydrogenation can be carried out in the absence of a solvent or diluent, ie., it is not necessary to carry out the hydrogenation in solution.

It is also possible directly to hydrogenate a melt of the polymer.

However, a solvent or dilute is preferably used. The solvent or diluent used may be any suitable solvent or diluent. The choice is not critical but the solvents/diluents should be inert under the hydrogenation conditions. However, the solvents/diluents may also contain small amounts of water.

Examples of suitable solvents or diluents include the following:

hydrocarbons, eg. hexane, cyclohexane, methylcyclohexane, heptane, octane, toluene, etc.; and straight-chain or cyclic ethers, such as tetrahydrofuran, dioxane, dibutyl ether, methyl tert-butyl ether, etc., ketones, such as methyl ethyl ketone and acetone, esters, eg., ethyl acetate, or amides, such as dimethylformamide and N-methylpyrrolidone.

Cyclohexane, toluene or tetrahydrofuran is preferably used. Mixtures of these and other solvents or diluents may also be used.

If the polymer was obtained by solution polymerization, the resulting solution containing the polymer may be used directly for the hydrogenation in the novel process.

The amount of solvent or diluent used is not limited in a particular manner in the novel process and can be freely chosen to meet requirements, but preferred amounts are those which leads to a 1–70, preferably 1–40, % strength by weight solution of the polymer to be hydrogenated.

The hydrogenated is carried out at suitable pressures and temperatures. Pressures above $2 \cdot 10^6$ Pa are preferred, particularly preferably from $5 \cdot 10^6$ to $4 \cdot 10^7$ Pa. Preferred temperatures are from about 30 to about 250° C., particularly preferably from about 100 to about 220° C., in particular from about 150 to about 200° C.

The hydrogenation process can be carried out continuously or as a batch process.

In the continuous process, the amount of polymer or polymers to be hydrogenated is preferably from 0.01 to about 1, more preferably from about 0.05 to about 0.7, kg per liter of catalyst per hour.

The hydrogenation gases used may be any desired gases which contain free hydrogen and have no harmful amounts of catalyst poisons, such as CO. For example, reformer exit gases may be used. Preferably, pure hydrogen is used as the hydrogenation gas.

The Examples which follow illustrate the invention.

EXAMPLES

Example 1

Preparation of catalyst A:

170 g of water were added in portions to a mixture of 900 g of a cobalt/aluminum alloy consisting of 52% by weight of cobalt and 48% by weight of aluminum, 8 g of tylose and 60 g of a polyvinyl alcohol having a molar mass of 85,000–146,000 g/mol, and the material was kneaded in a kneader for 6 hours. The kneaded material thus obtained was then molded at a pressure of 45–50 bar in an extruder to give extrudates having a diameter of 3 mm. The extrudates thus obtained were dried at 120° C. for 16 hours. The calcination was carried out first for 1 hour at 450° C., then for 1 hour at 750° C. and finally for 2 hours at 900° C. For activation, 1.5 l of a 20% strength NaOH solution were added at 90° C. to 500 g of the extrudates thus prepared. After 24 hours, the excess NaOH solution was decanted and the activated extrudates were washed with water until the pH of the was water had decreased to 7.5. This activation treatment was carried out four times altogether.

The catalyst thus obtained had a total pore volume of 0.44 ml/g and a macropore volume of 0.40 ml/g; the proportion of macropores was thus 91%. No α-alumina was detectable with the aid of X-ray diffractometry (XRD).

Example 2

Preparation of catalyst B:

200 g of water were added in portions to a mixture of 900 g of a cobalt/aluminum alloy consisting of 52% by weight of cobalt and 48% by weight of aluminum, 8 g of tylose and 80 g of a polyvinyl alcohol having a molar mass of 85,000–146,000 g/mol, and the material was kneaded in a kneader for 4 hours. The kneaded material thus obtained was then molded at a pressure of $6.5 \cdot 10^6$ Pa (65 bar) in an extruder to give extrudates having a diameter of 3 mm. The extrudates thus obtained were dried at 120° C. for 16 hours. The calcination was carried out first for 1 hour at 450° C., then for 1 hour at 750° C. and finally for 2 hours at 900° C. For activation, 1.5 l of a 20% strength NaOH solution were added at 90° C. to 500 g of the extrudates thus prepared. After 24 hours, the excess NaOH solution was decanted and the activated extrudates were washed with water until the pH of the wash water had decreased to 7.5. This activation treatment was carried out four times altogether.

The catalyst thus obtained had a total pure volume of 0.58 ml/g and a macropore volume of 0.54 ml/g; the proportion of macropores was thus 93%. No α-alumina was detectable with the aid of XRD.

Example 3

Preparation of catalyst C:

230 g of water were added in portions to a mixture of 900 g of a cobalt/aluminum alloy consisting of 52% by weight of cobalt and 48% by weight of aluminum, 8 g of tylose and 60 g of a polyvinyl alcohol having a molar mass of 13,000–23,000 g/mol, and the material was kneaded in a kneader for 3 hours. The kneaded material thus obtained was then molded at a pressure of $6.5 \cdot 10^6$ Pa (65 bar) in an extruder to give extrudates having a diameter of 3 mm. The extrudates thus obtained were dried at 120° C. for 16 hours. The calcination was carried out first for 1 hour at 450° C., then for 1 hour at 750° C. and finally for 2 hours at 900° C. For activation, 1.5 l of a 20% strength NaOH solution were added at 90° C. to 500 g of the extrudates thus prepared. After 24 hours, the excess NaOH solution was decanted and the activated extrudates were washed with water until the pH of the wash water had decreased to 7.5. This activation treatment was carried out once.

The catalyst thus obtained had a total pure volume of 0.35 ml/g and a macropore volume of 0.32 ml/g; the proportion of macropores was thus 91%. No α-alumina was detectable with the aid of XRD.

Example 4

Hydrogenation with the use of catalyst A:

100 g of a 15% strength by weight solution of an acrylonitrile/butadiene copolymer containing 18% by weight of acrylonitrile and having a weight average molecular weight of 3000 in tetrahydrofuran (THF), 60 ml of ammonia and 15 g of catalyst A were introduced into a 300 ml pressure-resistant autoclave. Hydrogenation was then carried out batchwise at 180° C. and $2.5 \cdot 10^7$ Pa for 12 hours. The THF used as the solvent was distilled off.

The nitrile conversion was 95%. 95% of the resulting amine was a primary amine. The molecular weight did not decrease.

Example 5

Hydrogenation with the use of catalyst B:

100 g of a 15% strength by weight solution of an acrylonitrile/butadiene copolymer containing 18% by weight of acrylonitrile and having a weight average molecular weight of 3000 in tetrahydrofuran (THF), 60 ml of ammonia and 15 g of catalyst B were introduced into a 300 ml pressure-resistant autoclave. Hydrogenation was then carried out batchwise at 180° C. and $2.5 \cdot 10^7$ Pa for 12 hours. The THF used as the solvent was distilled off.

The nitrile conversion was 96%. There was no decrease in molecular weight.

Example 6

Hydrogenation with the use of catalyst C:

100 g of a 15% strength by weight solution of an acrylonitrile/butadiene copolymer containing 18% by weight of acrylonitrile and having a weight average molecular weight of 3000 in tetrahydrofuran (THF), 60 ml of ammonia and 15 g of catalyst C were introduced into a 300 ml pressure-resistant autoclave. Hydrogenation was then carried out batchwise at 180° C. and $2.5 \cdot 10^7$ Pa for 12 hours. The THF used as the solvent was distilled off.

The nitrile conversion was 85%. There was no decrease in molecular weight.

What is claimed is:

1. An activated fixed-bed Raney metal catalyst which is free of metal powder, which has macropores and which is obtained from an alloy of aluminum and at least one additional metal selected from the group consisting of copper and the metals of subgroup VIII of the Periodic Table, wherein the catalyst contains more than 80% by volume, based on the total pores, of macropores.

2. The catalyst defined in claim 1, wherein the additional metal is selected from the group consisting of nickel, cobalt, copper, iron and a mixture of two or more thereof.

3. The catalyst defined in claim 1, which comprises less than 1% by weight, based on the total weight of the catalyst, of $\alpha\text{-}Al_2O_3$.

4. The catalyst defined in claim 1, further comprising at least one promoter element selected from the group of the elements of subgroup IV, V, VI and VIII of the Periodic Table, the promoter element or the mixture of two or more thereof being different from the one or more additional metals.

5. A process for the preparation of an activated fixed-bed Raney metal catalyst as defined in claim 1, which comprises the following stages:
   (1) preparing a kneaded material comprising the alloy, a molding assistant, water and a pore former,
   (2) shaping the kneaded material to give a molding,
   (3) calcining the molding, and
   (4) treating the calcined molding with an alkali metal hydroxide,
wherein at least one water-miscible polymer having a molar mass of from more than 6000 to 500,000 g/mol is used as the pore former.

6. The process as defined in claim 5, wherein the water-miscible polymer is a polyvinyl alcohol.

7. The process defined in claim 5, wherein the molding assistant is stearic acid or tylose which is present in an amount of from 0.1 to 3% by weight, based on the total weight of the kneaded material.

8. The process defined in claim 5, wherein the calcination of the moldings is carried out in a three-stage process at atmospheric pressure.

9. An activated fixed-bed Raney metal catalyst which is free of metal powder, which has macropores, and which is obtained from an alloy of aluminum and at least one additional metal selected from the group of copper and the metals of subgroup VIII of the Periodic Table, obtainable by
   (1) preparing a kneaded material comprising the alloy, a molding assistant, water and a pore former,
   (2) shaping the kneaded material to give a molding,
   (3) calcining the molding, and
   (4) treating the calcined molding with an alkali metal hydroxide,
wherein at least one water-miscible polymer having a molar mass of from more than 6000 to 500,000 g/mol is used as the pore former.

10. A precursor for an activated fixed-bed Raney metal catalyst as defined in claim 9, obtainable by
   (1) preparing a kneaded material comprising the alloy, a molding assistant, water and a pore former,
   (2) shaping the kneaded material to give a molding, and
   (3) calcining the molding,
wherein at least one water-miscible polymer having a molar mass of from more than 6000 to 500,000 g/mol is used as the pore former.

11. The catalyst defined in claim 1, which contains at least 90% by volume, based on the total pores, of macropores.

12. The catalyst defined in claim 1, which contains at least 95% by volume, based on the total pores, of macropores.

13. The catalyst defined in claim 1, which comprises less than 0.5% by weight, based on the total weight of the catalyst, of $\alpha\text{-}Al_2O_3$.

14. The catalyst defined in claim 1, which comprises less than 0.3% by weight, based on the total weight of the catalyst, of $\alpha\text{-}Al_2O_3$.

15. The catalyst defined in claim 9, which contains at least 80% by volume, based on the total pores, of macropores.

16. The catalyst defined in claim 9, which contains at least 90% by volume, based on the total pores, of macropores.

17. The catalyst defined in claim 9, which contains at least 95% by volume, based on the total pores, of macropores.

18. The catalyst defined in claim 9, wherein the additional metal is selected from the group consisting of nickel, cobalt, copper, iron and a mixture of two or more thereof.

19. The catalyst defined in claim 9, which comprises less than 1% by weight, based on the total weight of the catalyst, of $\alpha\text{-}Al_2O_3$.

20. The catalyst defined in claim 9, which comprises less than 0.5% by weight, based on the total weight of the catalyst, of $\alpha\text{-}Al_2O_3$.

21. The catalyst defined in claim 9, which comprises less than 0.3% by weight, based on the total weight of the catalyst, of $\alpha\text{-}Al_2O_3$.

22. The catalyst defined in claim 9, further comprising at least one promoter element selected from the group of the elements of subgroup IV, V, VI and VIII of the Periodic Table, the promoter element or the mixture of two or more thereof being different from the one or more additional metals.

* * * * *